(12) United States Patent
Loganathan et al.

(10) Patent No.: US 12,478,564 B2
(45) Date of Patent: Nov. 25, 2025

(54) PERSONAL CARE COMPOSITION WITH VISUALLY DISTINCT AQUEOUS AND OIL PHASE

(71) Applicant: Conopco, Inc., Englewood Cliffs, NJ (US)

(72) Inventors: Chandersekar Loganathan, Shanghai (CN); Yueyuan Pan, Shanghai (CN)

(73) Assignee: Conopco, Inc., Hoboken, NJ (US)

( * ) Notice: Subject to any disclaimer, the term of this patent is extended or adjusted under 35 U.S.C. 154(b) by 646 days.

(21) Appl. No.: 17/918,339

(22) PCT Filed: Apr. 20, 2021

(86) PCT No.: PCT/EP2021/060140
§ 371 (c)(1),
(2) Date: Oct. 12, 2022

(87) PCT Pub. No.: WO2021/228502
PCT Pub. Date: Nov. 18, 2021

(65) Prior Publication Data
US 2023/0157932 A1 May 25, 2023

(30) Foreign Application Priority Data
Jun. 18, 2020 (EP) ................................. 20180677

(51) Int. Cl.
| | |
|---|---|
| *A61K 8/03* | (2006.01) |
| *A61K 8/36* | (2006.01) |
| *A61K 8/42* | (2006.01) |
| *A61K 8/60* | (2006.01) |
| *A61Q 19/00* | (2006.01) |

(52) U.S. Cl.
CPC ............... *A61K 8/03* (2013.01); *A61K 8/361* (2013.01); *A61K 8/42* (2013.01); *A61K 8/604* (2013.01); *A61Q 19/00* (2013.01); *A61K 2800/262* (2013.01)

(58) Field of Classification Search
CPC . A61K 8/03; A61K 8/361; A61K 8/42; A61K 8/604; A61K 2800/262; A61Q 19/00
See application file for complete search history.

(56) References Cited

U.S. PATENT DOCUMENTS

| | | | |
|---|---|---|---|
| 3,810,478 A | 5/1974 | Olson, Jr. et al. | |
| 4,826,828 A | 5/1989 | Wilmott et al. | |
| 4,888,363 A | 12/1989 | Dulak et al. | |
| 4,992,265 A | 2/1991 | Davis et al. | |
| 5,599,548 A | 2/1997 | Granger et al. | |
| 5,811,110 A | 9/1998 | Granger et al. | |
| 5,880,314 A | 3/1999 | Shinomiya et al. | |
| 11,389,382 B2 | 7/2022 | Chen et al. | |
| 2003/0165546 A1 | 9/2003 | Resch et al. | |
| 2005/0238680 A1* | 10/2005 | Stella .................. | A61K 8/0295 424/401 |
| 2006/0008438 A1 | 1/2006 | Velarde et al. | |
| 2006/0078524 A1 | 4/2006 | Midha et al. | |
| 2006/0078527 A1 | 4/2006 | Midha et al. | |
| 2006/0079417 A1 | 4/2006 | Wagner et al. | |
| 2006/0210612 A1 | 9/2006 | Simon et al. | |
| 2007/0009446 A1 | 1/2007 | Romero | |
| 2007/0117729 A1 | 5/2007 | Taylor et al. | |
| 2008/0299058 A1 | 12/2008 | Saito et al. | |
| 2009/0196836 A1 | 8/2009 | Tanner et al. | |
| 2010/0068307 A1 | 3/2010 | Nielloud | |
| 2011/0082217 A1 | 4/2011 | Johnson et al. | |
| 2012/0276177 A1 | 11/2012 | Hilliard, Jr. et al. | |
| 2013/0251644 A1 | 9/2013 | Majhi et al. | |
| 2014/0147525 A1 | 5/2014 | de Paula et al. | |
| 2016/0256367 A1 | 9/2016 | Charbit | |
| 2016/0324869 A1 | 11/2016 | Wei et al. | |
| 2017/0087064 A1 | 3/2017 | Ikeda et al. | |
| 2018/0161259 A1 | 6/2018 | Ha et al. | |
| 2018/0177695 A1 | 6/2018 | Miller et al. | |
| 2018/0360705 A1 | 12/2018 | Alam et al. | |
| 2019/0142706 A1* | 5/2019 | Sverdlove .............. | A61K 8/585 514/788 |

FOREIGN PATENT DOCUMENTS

| | | |
|---|---|---|
| CN | 1377403 | 10/2002 |
| CN | 1237898 | 1/2006 |
| CN | 1946375 | 4/2007 |
| CN | 103202775 | 7/2013 |
| CN | 104640534 | 5/2015 |
| CN | 106580755 | 4/2017 |
| CN | 107997996 | 5/2018 |
| CN | 108367179 | 8/2018 |
| CN | 108524322 | 9/2018 |

(Continued)

OTHER PUBLICATIONS

Machine Translation of DE2358822.*
Database GNPD (Online) Mintel; Oil Shaker Dual Phase Refining Oil; Decorté Phytotune; Sep. 2019; pp. 1-3, Record ID 6874605; Japan.
Database GNPD (Online) Mintel; Biphase Make-Up Remover; Vinésime Racine du Temps; May 2019; pp. 1-3, Record ID 6494461; France.
Database GNPD (Online) Mintel; Anti/Oxi+ Clarifying Gentle Cleansing Oil in Water; Shu Uemura Skin Purifier; Nov. 2018; pp. 1-4, Record ID 6118721; Japan.
Database GNPD (Online) Mintel; Eye Makeup Remover; Neutrogena Deep Clean; Sep. 2016; pp. 1- 2, Record ID 4277647; Greece.

(Continued)

*Primary Examiner* — Deborah D Carr
(74) *Attorney, Agent, or Firm* — Stephanie Huang

(57) ABSTRACT

Disclosed is a multi-phase personal care composition comprising an aqueous phase comprising fatty acid amide and nonionic surfactant and an oil phase, wherein the weight ratio of the nonionic surfactant to the fatty acid amide is at least 5:1, the aqueous phase is visually distinct from and in physical contact with the oil phase, and the nonionic surfactant is different from the fatty acid amide.

20 Claims, No Drawings

(56) References Cited

FOREIGN PATENT DOCUMENTS

| | | | |
|---|---|---|---|
| CN | 109248102 | | 1/2019 |
| CN | 109310591 | | 2/2019 |
| CN | 111000735 | | 4/2020 |
| DE | 2358822 | * | 6/1975 |
| DE | 9216886 | | 4/1994 |
| DE | 19501184 | | 7/1996 |
| DE | 102013226276 | | 7/2014 |
| EP | 1676560 | | 7/2006 |
| FR | 2252403 | | 6/1975 |
| FR | 2645740 | | 10/1990 |
| FR | 2835430 | | 8/2003 |
| JP | S62135404 | | 6/1987 |
| JP | H01294615 | | 11/1989 |
| JP | H11209235 | | 8/1999 |
| JP | 200095721 | | 4/2000 |
| JP | 2002284626 | | 3/2001 |
| JP | 2002255739 | | 9/2002 |
| JP | 2010280593 | | 12/2010 |
| JP | 2011001270 | | 1/2011 |
| JP | 2015229634 | | 12/2015 |
| WO | WO8606275 | | 11/1986 |
| WO | WO9622072 | | 7/1996 |
| WO | WO9807406 | | 2/1998 |
| WO | WO0123514 | | 4/2001 |
| WO | WO2005105033 | | 11/2005 |
| WO | WO2006042176 | | 4/2006 |
| WO | WO2014013420 | | 1/2014 |
| WO | WO2017110151 | | 6/2017 |
| WO | WO2017220310 | | 12/2017 |
| WO | WO2018114232 | | 6/2018 |
| WO | WO2019011619 | | 1/2019 |
| WO | WO2021228492 | | 11/2021 |
| WO | WO2021228503 | | 11/2021 |
| WO | WO2021228519 | | 11/2021 |

OTHER PUBLICATIONS

Database GNPD (Online) Mintel; Biphasic Hydrating Cleansing; Violetta Rostro y Ojos; Mar. 2015; pp. 1-2, Record ID 3046791; Argentina.

Leszek Marszall; Messungen des effektiven HLB-Wertes nichtionogener Tenside mittels Phenol-Titrationsmethode; Parfumerie und Kosmetik; 1979; pp. 444-448—with English translation; vol. 60; Germany.

Dr. Otto-Albrecht Neumuller; Franck'sce Verlagshandlung, Stuttgart; Rompps Chemie-Lexikon; 1983; pp. 1750-1751, with English translation; 8th Edition; Germany.

Search Report and Written Opinion in EP20180662; Dec. 14, 2020; European Patent Office (EPO).

Database GNPD (Online) Mintel; Once and No Makeup 2-Phase Make-up Remover; Nature.Med Tonik; Sep. 2017; pp. 1-3, Record ID 5111633, XP055754195; Ukraine.

Database GNPD (Online) Mintel; Renew & Repair Solution; Beauty Drops; Mar. 2019; pp. 1-5, Record ID 6432731, XP055754197; Spain.

Search Report and Written Opinion in EP20180664; 14-Dec. 2020; European Patent Office (EPO).

Search Report and Written Opinion in PCTEP2021060141; Jul. 7, 2021; World Intellectual Property Org. (WIPO).

Database GNPD (Online) Mintel; Bouncy Skin Kit; Glow Recipe; Jun. 2020; pp. 1-6, Record ID 7904250, XP055754204; United Kingdom.

Database GNPD (Online) Mintel; VitaC Glycolic Brightening Serum; Murad Environmental Shield; Mar. 2020; pp. 1-6, Record 7452259, XP055754208; .; United States of America.

Search Report and Written Opinion in PCTEP2021059985; 07-Jul. 2021; World Intellectual Property Org. (WIPO).

Search Report and Written Opinion in EP20180677; Dec. 14, 2020; European Patent Office (EPO).

Search Report and Written Opinion in EP20180672; Dec. 14, 2020; European Patent Office (EPO).

Search Report and Written Opinion in PCTEP2021060317; Jul. 5, 2021; World Intellectual Property Org. (WIPO).

Search Report and Written Opinion in PCTEP2021060140; Jul. 5, 2021; World Intellectual Property Org. (WIPO).

IPRP2 in PCTEP2021060140; Apr. 25, 2022; World Intellectual Property Org. (WIPO).

Written Opinion 2 in PCTEP2021060141; Apr. 25, 2022; World Intellectual Property Org. (WIPO).

IPRP2 in PCTEP2021060141; Jun. 24, 2022; World Intellectual Property Org. (WIPO).

Written Opinion 2 in PCTEP2021060317; Mar. 31, 2022; World Intellectual Property Org. (WIPO).

IPRP2 in PCTEP2021060317; May 10, 2022; World Intellectual Property Org. (WIPO).

IPRP2 in PCTEP2021059985; May 17, 2022; World Intellectual Property Org. (WIPO).

Written Opinion 2 in PCTEP2021059985; Mar. 24, 2022; World Intellectual Property Org. (WIPO).

Ma Zhenyou; Manual of Cosmetic Preparations for Skin Beauty; Publishing House of Traditional Chinese Medical Books; Jan. 31, 2015; pp. 471-472, with English translation.

* cited by examiner

PERSONAL CARE COMPOSITION WITH VISUALLY DISTINCT AQUEOUS AND OIL PHASE

CROSS REFERENCE TO RELATED APPLICATIONS

The present application is a U.S. National Phase Application under 35 U.S.C. § 371 of International Application No. PCT/EP2021/060140, filed on Apr. 20, 2021, which claims priority to International Application No. PCT/CN2020/089330, filed on May 9, 2020, and European Patent Application No. 20180677.5, filed on Jun. 18, 2020, the contents of which are incorporated herein in their entireties.

FIELD OF THE INVENTION

The present invention relates to a multi-phase personal care composition. In particular, the present invention relates to a multi-phase personal care composition comprising an aqueous phase comprising fatty acid amide nonionic surfactant and an oil phase, wherein the weight ratio of the nonionic surfactant to the fatty acid amide is at least 5:1, the aqueous phase is visually distinct from and in physical contact with the oil phase, and the nonionic surfactant is different from the fatty acid amide.

BACKGROUND OF THE INVENTION

Nowadays, the personal care composition with more user involvement are seen as more attractive by the consumer. The multi-phase personal care composition with rapid in situ generation of dispersion is an excellent example. The product delivered to the consumer is a multi-phase personal care composition with at least two visually distinct phases.

Before applying, the consumer may generate a well-dispersed personal care product by shaking the container for a few seconds by hand. Then, the person care product is left to stand to recover to be multi-phase personal care composition before next use. It would be much less attractive if the interface between the at least two phases is not clear and distinct.

When the present inventor developed a multi-phase personal care composition containing fatty acid amide, unexpectedly it was found that a multi-phase personal care composition having clear interface is not able to be recovered after shaking. Such appearance is not appealing to the consumers.

There is a need, therefore, for a way to provide a multi-phase personal care composition containing fatty acid amide which has a clear interface. It was surprisingly found that by including nonionic surfactant with a weight ratio of the nonionic surfactant to the fatty acid amide being at least 5:1, a multi-phase personal care composition having clear interface was achieved after shaking.

SUMMARY OF THE INVENTION

In a first aspect, the present invention is directed to a multi-phase personal care composition comprising an aqueous phase comprising fatty acid amide and nonionic surfactant, and an oil phase, wherein the weight ratio of the nonionic surfactant to the fatty acid amide is at least 5:1, the aqueous phase is visually distinct from and in physical contact with the oil phase, the non-ionic surfactant comprises the condensation products of aliphatic alcohols having from 8 to 22 carbon atoms in either straight or branched chain configuration with ethylene oxide, condensates of alkylphenols having C6-C15 alkyl groups with 5 to 25 moles of ethylene oxide per mole of alkylphenol, polyoxyethylene sorbitan fatty acid esters, alkyl glucoside, or a mixture thereof; and the nonionic surfactant is different from the fatty acid amide.

In a second aspect, the present invention is directed to kit of parts comprises a cosmetic container, a multi-phase personal care composition of the present invention and instruction for use of the kit.

In a third aspect, the present invention is directed to a method for preparing a personal care product comprising the step of shaking a cosmetic container containing multi-phase personal care composition of the present invention by human hand.

All other aspects of the present invention will more readily become apparent upon considering the detailed description and examples which follow.

DETAILED DESCRIPTION OF THE INVENTION

Except in the examples, or where otherwise explicitly indicated, all numbers in this description indicating amounts of material or conditions of reaction, physical properties of materials and/or use may optionally be understood as modified by the word "about".

All amounts are by weight of the composition, unless otherwise specified.

It should be noted that in specifying any range of values, any particular upper value can be associated with any particular lower value.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy.

Where a feature is disclosed with respect to a particular aspect of the invention (for example a composition of the invention), such disclosure is also to be considered to apply to any other aspect of the invention (for example a method of the invention) mutatis mutandis.

"Visually distinct" as used herein refers the regions occupied by each phase can be separately seen by human eye as distinctly separate regions in contact with one another (i.e., they are not emulsions or dispersions of particles of less than 100 microns).

"Multi-phase" as used herein refers to that at least two phases occupy separate and distinct physical spaces inside the container in which they are stored, but are in direct contact with one another (i.e., they are not separated by a barrier).

"Transparent" as used herein refers to that at least 70%, preferably at least 80%, more preferably at least 85% of light, having wavelength of 550 nm transmits a 1 cm thick of sample, measured by a UV-vis spectrometer (e.g. Perkin-Elmer Lambda 650S) at 25° C. "Opaque" as used herein refers to that no greater than 50%, preferably no greater than 30% of light transmits by same method.

Preferably, the fatty acid amide contains at least 6 carbon atoms. Suitable fatty acid preferably contains from 8 to 24 carbon atoms, preferably from 12 to 20 carbon atoms, and most preferably from 12 to 18 carbon atoms, because longer chain fatty acid amides are more beneficial for conditioning of the skin. In the most preferred embodiment of the invention, amides of essential fatty acids are employed because essential fatty acids provide nutrition for the skin. Examples of essential fatty acids include but are not limited to linoleic, linolenic, arachidonic, gamma-linolenic, homo-gamma-linolenic, and mixtures thereof. Linoleic acid is most preferred because it is also a precursor to ceramide.

Amides suitable for use in the present invention may be simple amides (i.e., those containing a —$CONH_2$ group), N-alkyl amides, N, N-dialkyl amides, mono-alkanol amides, and di-alkanol amides. Suitable alkyl or alkanol groups contain from 1 to 30 carbon atoms, preferably from 1 to 20 carbon atoms, and most preferably from 1 to 8 carbon atoms.

The preferred amides included in the present invention are mono- and di-alkanol amides, particularly of essential fatty acids. Alkanol amides are more commonly available than alkyl amides.

Preferably, the fatty acid amide is fatty alkanolamides (fatty acid alkanolamides), more preferably $C_8$ to $C_{20}$ fatty acid $C_1$ to $C_8$ alkanolamide. The preferred fatty acid amides are selected from mono- and diethanolamides of linoleic acid, palmitic acid, and coconut oil.

More preferably the fatty acid amide comprises cocamide MEA, cocamide DEA, lauramide DEA, stearamide MEA, myristamide DEA, stearamide DEA, oleylamide DEA, tallowamide DEA, tallowamide MEA, isostearamide DEA, isostearamide MEA, or a mixture thereof. Even more preferably fatty acid amide comprises cocamide MEA and most preferably the fatty acid amide is cocamide MEA.

The fatty acid amide is included in the inventive compositions in an amount ranging from 0.0001% to 10%, preferably from 0.01% to 4%, most preferably from 0.1% to 1% by weight of the total amount of the composition.

Preferably the non-ionic surfactant has an HLB value of 10 to 18, and more preferably 12 to 16. The Hydrophilic-Lipophilic Balance (HLB) is a measure of the degree to which it is hydrophilic or lipophilic. It can be determined experimentally by the phenol titration method of Marszall; see "Parfumerie, Kosmetik", Vol. 60, 1979, pp. 444-448; and Rompp, Chemistry Lexicon, 8th Edition 1983, p. 1750.

The non-ionic surfactant comprises: a) the condensation products of aliphatic alcohols having from 8 to 22 carbon atoms in either straight or branched chain configuration with ethylene oxide, such as a coconut alcohol/ethylene oxide condensates having from 2 to 15 moles of ethylene oxide per mole of coconut alcohol; b) condensates of alkylphenols having C6-C15 alkyl groups with 5 to 25 moles of ethylene oxide per mole of alkylphenol; c) polyoxyethylene sorbitan fatty acid esters, for example polyoxyethylene sorbitan $C_{6-24}$ fatty acid esters; d) alkyl glucoside, or a mixture thereof.

Preferably the nonionic surfactant comprises polyoxyethylene sorbitan fatty acid ester, alkyl glucoside or a mixture thereof, More preferably the nonionic surfactant comprises a $C_6$ to $C_{20}$ alkyl glucoside, polyoxyethylene sorbitan $C_{6-24}$ fatty acid esters or a mixture thereof, even more preferably the nonionic surfactant comprises $C_5$ to $C_{20}$ alkyl glucoside, still even more preferably the nonionic surfactant comprises nonionic surfactant having INCI (International Nomenclature of Cosmetic Ingredients) name of caprylyl/capryl glucoside and most preferably the nonionic surfactant is caprylyl/capryl glucoside. Alkyl glucoside as used herein includes alkyl polyglucosides.

Preferred alkyl glucosides is represented by formula of RO-$(G)_n$, wherein R is a branched or straight chain alkyl group which may be saturated or unsaturated, G is a saccharide group, and the degree of polymerisation, n, may have a value of from 1 to 10; Preferably R has a mean alkyl chain length of from $C_5$ to $C_{20}$, G is selected from $C_5$ or C monosaccharide residues and n has a value of from 1 to 6; more preferably R has a mean alkyl chain length of from $C_6$ to $C_{16}$, G is glucose and n has a value of from 1 to 6. Even more preferably, R has a mean alkyl chain length of from $C_6$ to $C_{16}$, G is glucose and n has a value of from 1 to 6.

Preferred polyoxyethylene sorbitan fatty acid esters includes polyoxyethylene sorbitan $C_{6-24}$ fatty acid esters, more preferably polyoxyethylene sorbitan $C_{10-20}$ fatty acid esters. More preferably, the polyoxyethylene sorbitan fatty acid ester comprises polysorbate 20, polysorbate 80 or a mixture thereof.

Preferably, the amount of the non-ionic surfactant is 0.0001 to 15%, more preferably 0.001 to 10%, even more preferably 0.01 to 6%, still even more preferably 0.1 to 5%, and most preferably 1 to 4% by weight of the composition.

The weight ratio of the nonionic surfactant to the fatty acid amide is preferably 5:1 to 50:1, more preferably 5:1 to 20:1, even more preferably 5:1 to 8:1, still even more preferably 5:1 to 7:1.

Preferably, the composition comprises retinoid. Typically, the retinoid is selected from retinyl ester, retinol, retinal, retinoic acid or a mixture thereof. More preferably the retinoid comprises retinol, retinyl ester, or a mixture thereof and even more preferably the retinoid is selected from retinol, retinyl ester, or a mixture thereof.

The term "retinol" includes the following isomers of retinol: all-trans-retinol, 13-cis-retinol, 11-cis-retinol, 9-cis-retinol, 3,4-didehydro-retinol, 3,4-didehydro-13-cis-retinol; 3,4-didehydro-11-cis-retinol; 3,4-didehydro-9-cis-retinol. Preferred isomers are all-trans-retinol, 13-cis-retinol, 3,4-didehydro-retinol, 9-cis-retinol. Most preferred retinol is all-trans-retinol, due to its wide commercial availability. Retinyl ester is an ester of retinol. The term "retinol" has been defined above. Retinyl esters suitable for use in the present invention are preferably $C_1$-$C_{30}$ esters of retinol, more preferably $C_2$-$C_{20}$ esters of retinol, and most preferably $C_2$, $C_3$, and $C_{16}$ esters of retinol. The retinyl ester for use in the present invention is preferably selected from retinyl palmitate, retinyl acetate, retinyl linoleate, retinyl oleate, retinyl propionate or a mixture thereof. More preferably the retinyl ester is selected from retinyl palmitate, retinyl acetate, retinyl propionate, or a mixture thereof. Most preferably the retinyl ester is selected from retinyl palmitate, retinyl propionate, or a mixture thereof.

Particularly preferred retinoid is selected from all-trans-retinol, retinyl palmitate, retinyl acetate, retinyl propionate, or a mixture thereof. Most preferably the retinoid is selected from retinyl palmitate, retinyl propionate, or a mixture thereof.

Preferably, retinoid is employed in the composition in an amount of 0.0001% to 8% by weight of the composition, more preferably in an amount of 0.0005% to 3%, even more preferably from 0.1 to 1% and most preferably in an amount of 0.2% to 0.8% by weight of the composition.

The composition may comprise resorcinol derivative. Resorcinol derivative preferably refers to that at least one hydrogen on the ring structure and/or on a hydroxy group of the resorcinol replaced with an alkyl group, phenyl alkyl group. Preferably, the resorcinol derivative is 4-substituted resorcinol. Preferably, the resorcinol derivative is selected from 4-ethyl resorcinol, 4-butyl resorcinol, 4-hexyl resorcinol, phenylethyl resorcinol, or a mixture thereof, and more preferably, the resorcinol derivative comprises 4-hexyl resorcinol.

The amount of the resorcinol derivative is preferably in the range of 0.00001 to 10%, more preferably from 0.001 to 5% and most preferably from 0.1 to 0.6% by weight of the total amount of the composition.

Preferably, the composition comprises triglyceride. More preferably, the composition comprises caprylic/capric triglyceride, coconut oil, sunflower seed oil, safflower oil, cottonseed oil, olive oil or a mixture thereof. Particularly preferred triglyceride is caprylic/capric triglyceride. Preferably, the amount of triglyceride is 0.001 to 12%, more preferably 0.1 to 8%, even more preferably 0.5 to 5% by weight of the composition.

Preferably, the composition comprises fatty ester. Fatty ester as used herein refers to an ester having a straight chain with length of at least 6 carbon atoms, preferably at least 8 carbon atoms. Preferably, the fatty ester is liquid at 25° C. and atmospheric pressure. Preferably, the fatty ester is ester of carboxylic acids having 1 to 22 carbon atoms with an alcohol having 1 to 20 carbon atoms. Preferably, the carboxylic acids having 2 to 20 carbon atoms, more preferably 6 to 18, even more preferably 10 to 16 carbon atoms. Preferably the alcohol has 2 to 18, more preferably 3 to 15 carbon atoms.

Preferably, the fatty ester is selected from myristyl propionate, cetyl acetate, cetyl propionate, isodecyl neopentanoate, isopropyl myristate, isopropyl palmitate, isopropyl laurate, methyl laurate, methyl linoleate, methyl myristate, methyl stearate, methyl palmitate, isopropyl isostearate, butyl stearate, isobutyl palmitate, butyl myristate, ethyl palmitate, ethyl myristate, isobutyl stearate, isobutyl myristate, or mixtures thereof. Even more preferably, the fatty ester comprises myristyl propionate, cetyl propionate, isodecyl neopentanoate, isopropyl myristate, isopropyl palmitate, methyl myristate, methyl stearate, or a mixture thereof. Most preferably the fatty ester is isopropyl myristate.

The amount of the fatty ester is preferably in the range of 3 to 60%, more preferably from 8 to 55%, even more preferably from 15 to 50%, still even more preferably from 25 to 45%, most preferably from 28 to 42% by weight of the total amount of the composition.

To improve the sensory of the composition, it is preferable that the composition additionally comprises volatile oil. The term "volatile oil" is understood to mean an oil capable of evaporating on contact with the skin in less than one hour, at 25° C. and atmospheric pressure. The volatile oil is a volatile liquid cosmetic oil having in particular a nonzero vapor pressure, at 25° C. and atmospheric pressure, especially having a vapor pressure ranging from 0.13 Pa to 40 000 Pa preferably ranging 1.3 Pa to 1300 Pa.

Preferred volatile oil comprises $C_8$-$C_{16}$ isoalkanes, volatile silicone oils having from 2 to 7 silicon atoms. More preferably, the composition comprises isododecane, isodecane, isohexadecane, volatile dimethicone, cyclopentasiloxane, cyclohexasiloxane or a mixture thereof. Even more preferably, the composition comprises isododecane, isodecane, isohexadecane, cyclopentasiloxane, cyclohexasiloxane or a mixture thereof, and most preferably the composition comprises isohexadecane.

Preferably, the composition comprises polyhydric alcohol. Polyhydric alcohols may be selected from group of propyylene glycol, dipropylene glycol, polypropylene glycol, polyethylene glycol, sorbitol, hydroxypropyl sorbitol, hexylene glycol, 1,3-butylene glycol, isoprene glycol, ethoxylated glycerol, propoxylated glycerol or a mixture thereof. Most preferred polyhydric alcohol is glycerol known also as glycerin. The amount of polyhydric alcohol may range anywhere from 5 to 35%, preferably 8 to 25% and more preferably 12 and 18% by weight of the composition.

The composition may comprise water in amount of 10 to 90% by weight of the composition, more preferably from 15 to 78%, even more preferably from 20 to 65%, most preferably from 25 to 50% by weight of the composition.

The composition may comprise optional ingredients including moisturizing agent, skin lightening agent, preservatives, antioxidants, colorants, fragrance, or a combination thereof.

Vitamin B3 compounds (including derivatives of vitamin B3) e.g. niacin, nicotinic acid or niacinamide are the preferred skin lightening agent as per the invention, most preferred being niacinamide.

Preferably, the composition is a bi-phase composition. Preferably, both the aqueous and oil phases are transparent. Preferably The weight ratio of the aqueous phase to the oil phase is preferably in the range of 1:8 to 8:1, more preferably 1:4 to 4:1, and even more preferably 1:2 to 2:1.

The multi-phase personal care composition can be provided to a consumer in any suitable way, but it is preferable that the composition is provided inside a cosmetics container. The cosmetics container preferably has a volume of 2 to 250 mL, more preferably 5 to 100 mL, even more preferably 8 to 60 mL and still even more preferably 10 to 50 mL.

Preferably a kit of parts comprises a cosmetic container, a multi-phase personal care composition according to the invention and instruction for use of the kit. Preferably, the instruction comprises the step of mixing aqueous phase with the oil phase by any suitable way, for example by shaking the container by human hand for at least 1 seconds, preferably 2 seconds to 5 minutes, more preferably 3 seconds to 1 minutes. Thus, a homogeneous personal care product is formed. Preferably the personal care product is opaque.

Preferably, the multi-phase personal care composition is capable of generating a personal care product by shaking the cosmetic container by human hand, preferably for 1 second to 5 minutes, more preferably 1 second to 1 minutes. Preferably, the personal care product is capable of recovering to be a multi-phase personal care composition by standing for 3 minutes to 20 hours, more preferably 10 minutes to 7 hours, and even more preferably 15 minutes to 4 hours.

Preferably, the personal care composition (product) is a skin care composition (product). The skin care composition (product) refers to a composition (product) suitable for topical application to human skin, preferably is a leave-on product. The term "leave-on" as used with reference to compositions herein means a composition that is applied to or rubbed on the skin, and left thereon. The term "skin" as used herein includes the skin on the face (except eye lids and lips), neck, chest, abdomen, back, arms, under arms, hands, and legs. Preferably "skin" means includes the skin on the face (except eye lids and lips) and under arms, more preferably skin means skin on the face other than lips and eyelids.

The following examples are provided to facilitate an understanding of the invention. The examples are not intended to limit the scope of the claims.

EXAMPLES

Example 1

This example demonstrates the effect of weight ratio of surfactant to fatty amide on the formation of multi-phase skin care composition.

TABLE 1

| Phase | Ingredient | Sample (wt %)* | | | | |
|---|---|---|---|---|---|---|
| | | A | B | 1 | 2 | 3 |
| Aqueous | Deionized Water | To 100 | To 100 | To 100 | To 100 | To 100 |
| | Glycerin | 15.0375 | 15.0375 | 15.0375 | 15.0375 | 15.037 |
| | Disodium EDTA | 0.050 | 0.050 | 0.050 | 0.050 | 0.050 |
| | Cocamide MEA [a] | 0.2125 | 0.2125 | 0.2125 | 0.2125 | 0.2125 |
| | Caprylyl/Capryl Glucoside [b] | 0.62 | 0.93 | 1.24 | 1.55 | 1.86 |
| | Niacinamide | 3.000 | 3.000 | 3.000 | 3.000 | 3.000 |
| | Phenoxyethanol | 0.600 | 0.600 | 0.600 | 0.600 | 0.600 |
| | Iodopropynyl butylcarbamate | 0.006 | 0.006 | 0.006 | 0.006 | 0.006 |
| | Sodium Chloride | 0.600 | 0.600 | 0.600 | 0.600 | 0.600 |
| Oil | Isohexadecane | 35.47 | 35.47 | 35.47 | 35.47 | 35.47 |
| | Caprylic/Capric Triglyceride | 3.500 | 3.500 | 3.500 | 3.500 | 3.500 |
| | Retinol Propionate | 0.3168 | 0.3168 | 0.3168 | 0.3168 | 0.3168 |
| | Hexyl Resorcinol | 0.400 | 0.400 | 0.400 | 0.400 | 0.400 |
| | Fragrance | 0.200 | 0.200 | 0.200 | 0.200 | 0.200 |
| Recovery time (hours) | | About 1 | About 1 | About 2 | About 4 | About 6 |

*The level of the ingredients refers the level of active.
[a] Comperlan CMEA, supplied by BASF.
[b] Oramix CG 110, supplied by Seppic.

The samples in Table 1 were prepared by mixing Cocamide MEA at a temperature of 50 to 60° C., cooling down to room temperature, and adding other ingredients to get the aqueous phase. The ingredients for oil phase were mixed together to get the oil phase. The sample were obtained by mixing the aqueous phase and oil phase.

Then, each sample were packaged into three identical transparent jars with equal amount. All jars were shaken by human hand for 15 seconds at the same time. 5 uniformly dispersed skin care products were formed. They are let sit to recover to be the multi-phase state. The time for each sample for recovery to be multi-phase was recorded in last row of Table 1.

After all samples were recovered to a multi-phase state, the appearances of the samples were observed by naked eye. It was found that there are aggregates gathering at the interface of the aqueous phase and oil phase in samples A and B. In contrast, it was surprisingly found that the interfacial area is clear for samples 1 to 3. It was demonstrated that when the weight ratio of caprylyl/capryl glucoside to cocamide MEA is at least 5:1, the multi-phase composition provided a clear phase interface.

Example 2

This example demonstrates the effect of type of surfactant on the formation of multi-phase skin care composition.

TABLE 2

| Phase | Ingredient | Sample (wt %)* | | | | |
|---|---|---|---|---|---|---|
| | | C | 4 | 5 | 6 | 7 |
| Aqueous | Deionized Water | To 100 | To 100 | To 100 | To 100 | To 100 |
| | Glycerin | 15.0375 | 15.0375 | 15.0375 | 15.0375 | 15.0375 |
| | Disodium EDTA | 0.050 | 0.050 | 0.050 | 0.050 | 0.050 |
| | Cocamide MEA [a] | 0.2125 | 0.2125 | 0.2125 | 0.2125 | 0.2125 |
| | Cocamidopropyl Betaine [b] | 1.55 | — | — | — | — |
| | Decyl Glucoside [c] | — | 1.55 | — | — | — |
| | Caprylyl/Capryl Glucoside [d] | — | — | 1.55 | — | 1 |
| | Polysorbate 20 [e] | — | — | — | 1.55 | — |
| | Polysorbate 80 [f] | — | — | — | — | 1.55 |
| | Niacinamide | 3.000 | 3.000 | 3.000 | 3.000 | 3.000 |
| | Phenoxyethanol | 0.600 | 0.600 | 0.600 | 0.600 | 0.600 |
| | Iodopropynyl butylcarbamate | 0.006 | 0.006 | 0.006 | 0.006 | 0.006 |
| | Sodium Chloride | 0.600 | 0.600 | 0.600 | 0.600 | 0.600 |
| Oil | Isohexadecane | 9.47 | 9.47 | 9.47 | 9.47 | 9.47 |
| | Isopropyl Myristate | 29.23 | 29.23 | 29.23 | 29.23 | 29.23 |
| | Caprylic/Capric Triglyceride | 3.500 | 3.500 | 3.500 | 3.500 | 3.500 |
| | Retinol Propionate | 0.3168 | 0.3168 | 0.3168 | 0.3168 | 0.3168 |
| | Hexyl Resorcinol | 0.400 | 0.400 | 0.400 | 0.400 | 0.400 |
| | Fragrance | 0.100 | 0.100 | 0.100 | 0.100 | 0.100 |

*The level of the ingredients refers the level of active.
[a] Comperlan CMEA, supplied by BASF.
[b] Oramix NS 10 supplied by Seppic.
[c] Oramix CG 110 supplied by Seppic.
[d] NISSAN ANON BDF-SF, supplied by NOF CORPORATION.
[e] Tween 20, supplied by Croda.
[f] Tween 80, supplied by Croda.

All samples were prepared by following the same procedure as described in Example 1. Then, each sample were packaged into three identical transparent jars with equal amount. All jars were shaken by human hand for 15 seconds at the same time. 5 uniformly dispersed skin care products were formed. They are let sit overnight (about 15 hours) to recover to be the multi-phase state. It was observed by naked eyes that the majority of sample C is a white emulsion, indicating that it is not able to recover to be a multi-phase state. In contract, samples 4 to 7 are recovered to be a transparent bi-phase composition in about 4 hours.

The invention claimed is:

1. A multi-phase personal care composition comprising:
   (a) an aqueous phase comprising fatty acid amide and nonionic surfactant; and
   (b) an oil phase,
   wherein:
   (i) the nonionic surfactant to the fatty acid amide is present in a weight ratio of at least 5:1;
   (ii) the aqueous phase is visually distinct from and in physical contact with the oil phase;
   (iii) the non-ionic surfactant comprises the condensation products of aliphatic alcohols having from 8 to 22 carbon atoms in either straight or branched chain configuration with ethylene oxide, condensates of alkylphenols having $C_6$-$C_{15}$ alkyl groups with 5 to 25 moles of ethylene oxide per mole of alkylphenol, polyoxyethylene sorbitan fatty acid esters, alkyl glucoside, or a mixture thereof; and
   (iv) the nonionic surfactant is different from the fatty acid amide.

2. The multi-phase personal care composition according to claim 1, wherein the fatty acid amide is fatty acid alkanolamide and is present in amount of 0.0001% to 10% by weight of the total amount of the composition.

3. The multi-phase personal care composition according to claim 2, wherein the fatty acid amide is present in amount of 0.1% to 1% by weight of the total amount of the composition.

4. The multi-phase personal care composition according to claim 1, wherein the nonionic surfactant comprises alkyl glucoside, polyoxyethylene sorbitan fatty acid esters, or a mixture thereof.

5. The multi-phase personal care composition according to claim 1, wherein the nonionic surfactant is present in amount of 0.0001 to 15% by weight of the composition.

6. The multi-phase personal care composition according to claim 1, wherein the fatty acid amide to the nonionic surfactant is present in a weight ratio of 5:1 to 50:1.

7. The multi-phase personal care composition according to claim 1, wherein the composition comprises a retinoid.

8. The multi-phase personal care composition according to claim 7, wherein the retinoid is present in amount of 0.00001 to 10% weight of the total amount of the composition.

9. The multi-phase personal care composition according to claim 1, wherein both the aqueous phase and oil phase are transparent.

10. The multi-phase personal care composition according to claim 1, wherein the aqueous phase to the oil phase is present in a weight ratio of 1:8 to 8:1.

11. A kit of parts comprising a cosmetic container, the multi-phase personal care composition according to claim 1, and instructions for use of the kit.

12. A method for preparing personal care product, comprising the step of shaking a cosmetic container containing the multi-phase personal care composition according to claim 1, by human hand.

13. The multi-phase personal care composition according to claim 2, wherein the fatty acid amide is selected from mono- and diethanolamides of linoleic acid, palmitic acid, and coconut oil.

14. The multi-phase personal care composition according to claim 2, wherein the fatty acid amide comprises cocamide MEA.

15. The multi-phase personal care composition according to claim 4, wherein the nonionic surfactant comprises $C_6$ to $C_{20}$ alkyl glucoside, polyoxyethylene sorbitan $C_{6-24}$ fatty acid esters, or a mixture thereof.

16. The multi-phase personal care composition according to claim 5, wherein the nonionic surfactant is present in amount of 0.1 to 5% by weight of the composition.

17. The multi-phase personal care composition according to claim 6, wherein the fatty acid amide to the nonionic surfactant is present in a weight ratio of 5:1 to 8:1.

18. The multi-phase personal care composition according to claim 7, wherein the retinoid comprises retinyl palmitate, retinyl propionate, or a mixture thereof.

19. The multi-phase personal care composition according to claim 8, wherein the retinoid is present in amount of 0.1 to 0.6% by weight of the total amount of the composition.

20. The multi-phase personal care composition according to claim 10, wherein the aqueous phase to the oil phase is present in a weight ratio of 1:2 to 2:1.

* * * * *